United States Patent [19]

Krauser

[11] Patent Number: 4,517,232
[45] Date of Patent: May 14, 1985

[54] TABLE PAD INTERLOCK ASSEMBLY
[75] Inventor: Christopher P. Krauser, Toledo, Ohio
[73] Assignee: The Ohio Table Pad Company, Toledo, Ohio
[21] Appl. No.: 593,517
[22] Filed: Mar. 26, 1984
[51] Int. Cl.³ .............................................. B32B 3/06
[52] U.S. Cl. ...................................... 428/57; 52/588; 428/58
[58] Field of Search ................ 52/589, 593, 588, 536; 156/304.1, 304.5; 428/33, 52, 53, 57, 99, 58

[56] References Cited

U.S. PATENT DOCUMENTS

| | | | |
|---|---|---|---|
| 157,807 | 12/1874 | Evans | 428/542.8 X |
| 2,167,195 | 7/1939 | Ash | 428/194 X |
| 2,388,297 | 11/1945 | Slaughter | 428/53 |
| 2,595,111 | 4/1952 | Steward | 428/53 X |
| 2,670,567 | 3/1954 | Meyer | 428/102 X |
| 3,357,146 | 12/1967 | Gartrell | 52/593 X |
| 3,411,977 | 11/1968 | Slater, Jr. | 428/33 |
| 3,661,689 | 5/1972 | Spanier | 428/33 |
| 4,301,200 | 11/1981 | Langenfeld et al. | 428/33 |
| 4,308,702 | 1/1982 | Rajewski | 428/53 X |

Primary Examiner—Henry F. Epstein
Attorney, Agent, or Firm—Emch, Schaffer & Schaub

[57] ABSTRACT

An interlock assembly for use in joining table pad sections is disclosed. The assembly includes a first member having a base and a channel along one side of the base. A second member includes a base and a flange along one side. During locking, the flange is positioned within the channel. A projection is provided in the channel and a mating gap in the flange. Upon locking both transverse and longitudinal movement between the members is retarded.

18 Claims, 10 Drawing Figures

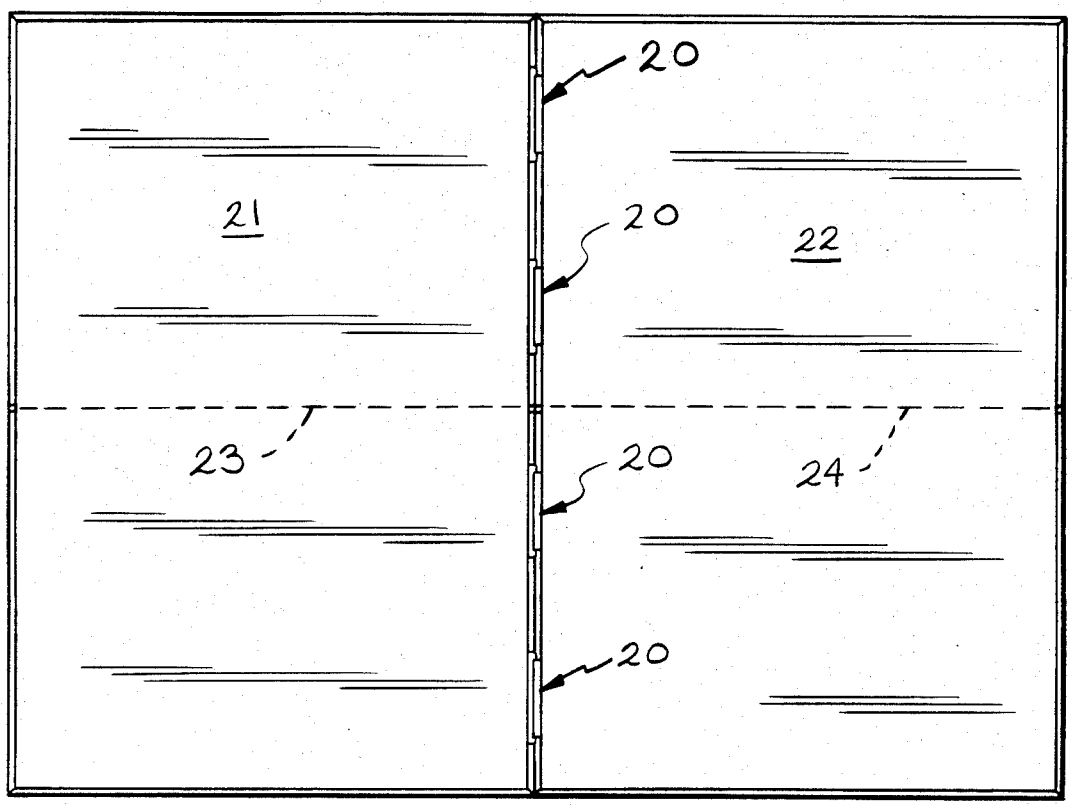
FIG. 1
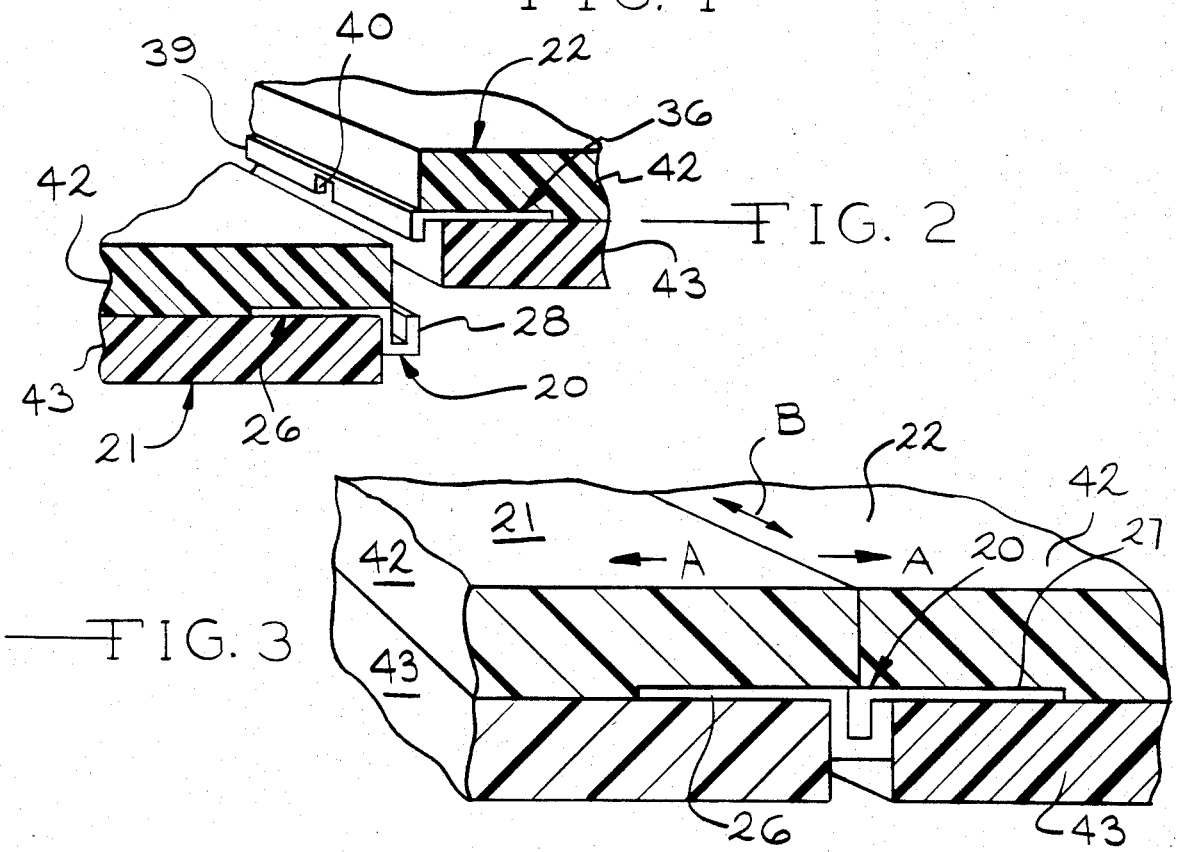
FIG. 2
FIG. 3

TABLE PAD INTERLOCK ASSEMBLY

BACKGROUND OF THE INVENTION

The present invention relates to an interlock assembly which is used in connecting sections of table pads. Various numbers of the table pad interlock assemblies are used in connecting individual sections of table pads depending on the sizes of the pads and the number of sections involved.

Any type of table pad interlock must be easy to operate, compatible from an aesthetic viewpoint and designed not to mar the surface of the underlying table.

SUMMARY OF THE INVENTION

The table pad interlock assembly, according to the present invention, is normally installed between layers of the pad. A first member includes a base and a channel while a second member includes a depending flange which mates in the channel when the assembly is in a locked position. Means are provided for preventing longitudinal movement between the channel and the flange when the assembly is in the locked position. In one embodiment, this includes a projection within the channel which is received in a gap or recess provided in the flange of the other member. Movement of the flange is thereby retarded along the longitudinal axis of the channel.

DESCRIPTION OF THE DRAWINGS

FIG. 1 is a plan view of two table pads which have been joined together by for interlock assemblies, according to the present invention;

FIG. 2 is a fragmentary, perspective view showing an interlock assembly, according to the present invention, being moved into a locked position;

FIG. 3 is a view similar to FIG. 2, taken on an enlarged scale after the interlock assembly has been moved to the locked position;

DESCRIPTION OF THE PREFERRED EMBODIMENTS

Figure 4:
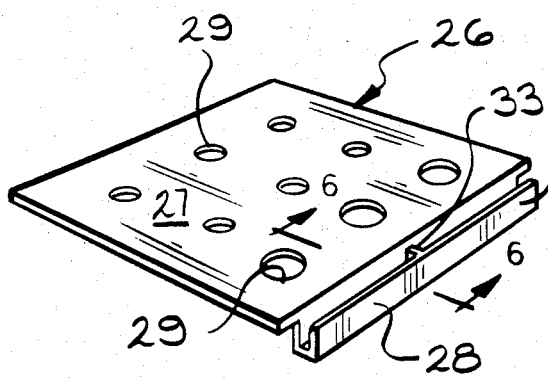
FIG. 4 is a perspective view of one member of an interlock assembly, according to the present invention.

A table pad interlock assembly, according to the present invention, is indicated by the reference number 20. Referring to FIG. 1, four interlock assemblies 20 are being utilized to interconnect table pads 21 and 22. When removed from the table, the pads 21 and 22 are unlocked, folded along fold lines 23, 24 and stored until again needed.

As best seen in FIGS. 2, 3, 4 and 5, the table pad interlock assembly 20 includes a first member 26 having a flat base 27 and a channel 28 along one side of the base 27. While the flat base 27 is rectangular, it may have varying shapes and fall within the scope of the present invention. The base 27 includes a plurality of openings 29 extending therethrough. The channel 28 includes a front wall 30, which in one embodiment (FIG. 6), has a radiused upper end 31.

Figure 7:
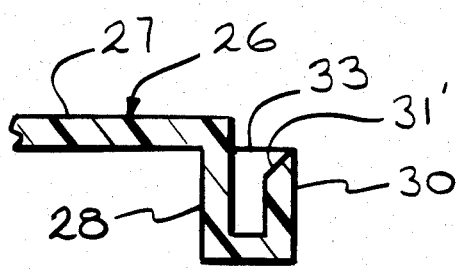
FIG. 7 is a view similar to FIG. 6 showing a angled leading edge on the front wall of the channel.

Referring to FIG. 7, the front wall 30 in another embodiment includes an angled upper end 31'. The upper interior corner of the upper end 31' defines an angle of between 20° and 70°. In the preferred embodiment, shown in FIG. 7, the angle defined is 45°.

A transverse bar or projection 33 is provided at the approximate mid point of the channel 28. In the present embodiment the projection 33 is integral with the channel 28 and extends across the entire channel.

The projection 33 serves as one portion of movement preventing means as will be explained below.

Figure 8:
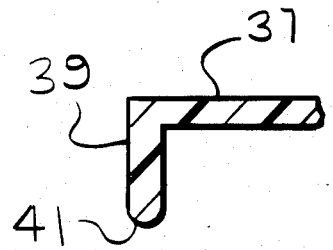
FIG. 8 is a fragmentary, sectional view taken along the line 8—8 of FIG. 5 and shown on an enlarged scale.
Figure 9:
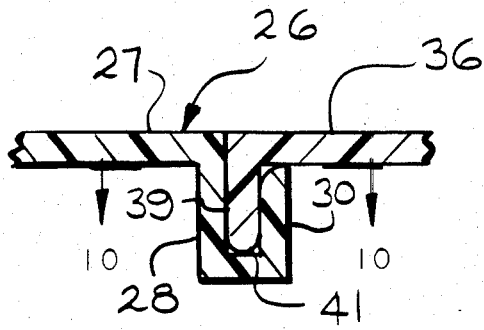
FIG. 9 is a fragmentary, cross-sectional view of an interlock assembly, according to the present invention in a locked position.

The interlock assembly 20 also includes a mating second member 36. The second member 36 includes a flat base 37, which is rectangular in the FIG. 5 embodiment, but may have varying shapes. A plurality of openings 38 are defined through the flat base 37 and a depending flange 39 is located at one side of the base 37. The flange 39 defines a recess or gap 40. The gap 40 receives the projection 33 in the first member 26 to prevent longitudinal movement of the flange 39 along the channel 28. The width of the gap 40 is at least twice as wide as the width of the projection 33. In the preferred embodiment, the gap 40 is approximately six times a wide as the projection 33. The centerline of the gap 40 is also aligned with the centerline of the projection 33 for ease of mating. As best shown in FIGS. 8 and 9, a lower end 41 of the depending flange 39 is provided with a radius.

Referring to FIGS. 2 and 3, to place the interlock assembly 20 in the locked position, shown in FIG. 3, the depending shoulder 39 of the second member 36 is moved vertically downwardly into the channel 28 of the first member 26.

Figure 10:
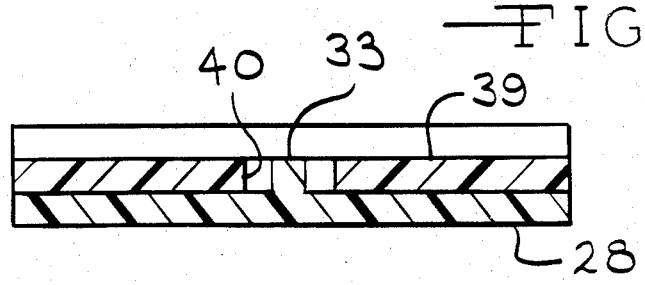
FIG. 10 is a cross-sectional view taken along the line 10—10 of FIG. 9 and showing the means for preventing longitudinal movement between the channel and the flange.

The mating of the flange 39 and the channel 28 retards movement in the directions of the arrows "A" as shown in FIG. 3. Similarly, as best shown in FIG. 10, movement in the direction "B", in the longitudinal direction of the channel, is retarded when the bar or projection 33 on the first member 26 engages the ends of the recess or gap 40 on the second member 36.

In the present embodiment, the table pads 21 and 22 include upper layers 42 and lower layers 43, which are joined together. The bases 27 and 37 of the first member 26 and second member 36, respectively, are positioned between the layers 42 and 43 and join to such layers 42, 43 by fastening means. In this particular embodiment, the fastening means comprise adhesive which is placed on both surfaces of the bases 27, 28 and also within the openings 29 and 38.

Figure 5:
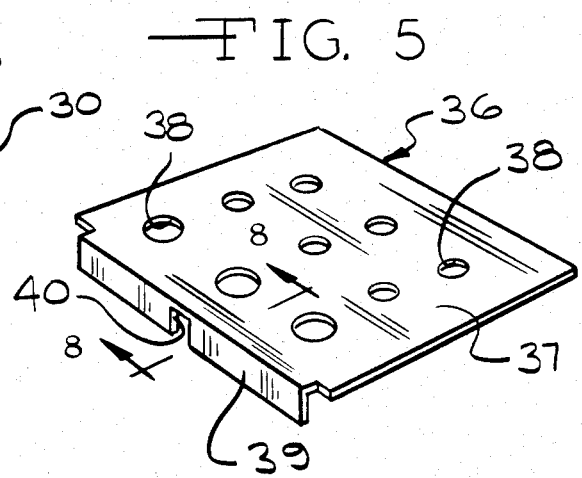
FIG. 5 is a view similar to FIG. 4 showing the other member of the interlock assembly.
Figure 6:
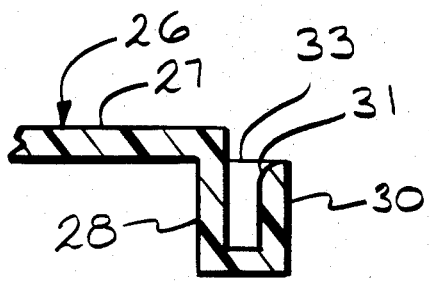
FIG. 6 is a fragmentary, sectional view taken along the line 6—6 of FIG. 4 and shown on an enlarged scale.

In the preferred embodiment, the plurality of holes or openings 29, 39 include larger diameter openings adjacent the channel 28 and the depending flange 39 respectively, as best shown in FIGS. 4 and 5.

Preferably, the first member and second member 36 of the interlock assembly is constructed of a polycarbonate. However, other embodiments may be constructed of, for examples, nylon, polyethylene, polyvinyl chloride or polypropylene.

Many revisions and modifications may be made to the specific structures shown in the drawings without departing from the scope of the following claims.

What I claim:

1. A table pad interlock assembly comprising, in combination, a first member including a first base and a channel extending along one side of said first base, a second member including a second base and a depending flange extending along one side and perpendicular to said second base, said channel of said first base receiving said flange when said assembly is in a locked position, said first and second members being restrained from movement transverse to the direction of the channel and means for preventing movement of said first and second members longitudinally in the direction of the channel when said assembly is in such locked position.

2. A table pad interlock assembly, according to claim 1, wherein said movement preventing means includes a projecting member adjacent said channel of said first member and a mating recess defined by said flange of said second member.

3. A table pad interlock assembly, according to claim 1, wherein said base of said first member and said base of said second member define a plurality of openings extending therethrough.

4. A table pad interlock assembly, according to claim 1, wherein said first and second members are constructed of a polycarbonate.

5. A table pad interlock assembly, according to claim 1, wherein said channel includes a front wall having an upper interior corner.

6. A table pad interlock assembly, according to claim 5, wherein said upper interior corner defines a radius.

7. A table pad interlock assembly, according to claim 5, wherein said upper interior corner defines an angle of between 20° and 70°.

8. A table pad interlock, according to claim 5, wherein said flange defines a bottom radiused edge.

9. A table pad interlock, according to claim 2, wherein said recess has a width at least two times the width of the mating projection.

10. A table pad interlock assembly comprising, in combination, a first member including a flat base and a channel extending along one side of said base, a projection within and extending across said channel, a second member including a flat base and a flange along one side of said base, said flange defining a gap, said flange of said second member being inserted into said channel of said first member when said interlock assembly is in a locked position, said projection being received by said gap in said flange whereby movement between said first and second members in both the transverse and the longitudinal directions of said channel is retarded.

11. A table pad interlock assembly comprising, in combination, a first table pad, a second table pad and at least two interlock assemblies for joining said first and second table pads together along a common edge, each of said table pads including an upper layer and a lower layer, said interlock assembly including a first member having a flat base and a channel extending along one side of said base, said flat base of said first member extending between said upper and lower layers of one of said table pads, said channel being positioned along said common edge, said interlock assembly also including a second member having a flat base and a flange perpendicular to said flat base extending along one side of said base, said flat base of said second member extending between said upper and lower layers of the other one of said table pads, said flange being positioned along said common edge in a mating relationship with said channel, a projection within said channel, said flange defining a gap, said projection being received by said gap in said flange when said first and second members are in the mating relationship, whereby movement between said first and second members in both the transverse and the longitudinal directions of said channel is retarded.

12. A table pad interlock assembly, according to claim 11, wherein said base of said first member and said base of said second member define a plurality of openings extending therethrough.

13. A table pad interlock assembly, according to claim 11, wherein said first and second members are constructed of a polycarbonate.

14. A table pad interlock assembly, according to claim 11, wherein said channel includes a front wall having an upper interior corner.

15. A table pad interlock assembly, according to claim 11, wherein said upper interior corner defines a radius.

16. A table pad interlock assembly, according to claim 11, wherein said upper interior corner defines an angle between 20° and 70°.

17. A table pad interlock, according to claim 11, wherein said flange defines a bottom radiused edge.

18. A table pad interlock, according to claim 11, wherein said recess has a width of at least two times the width of the mating projection.

* * * * *